United States Patent
Chae et al.

(10) Patent No.: US 12,183,926 B2
(45) Date of Patent: Dec. 31, 2024

(54) LITHIUM SECONDARY BATTERY POLYMER MATERIAL AND MANUFACTURING METHOD THEREFOR

(71) Applicants: LG CHEM, LTD., Seoul (KR); SEOUL NATIONAL UNIVERSITY R&DB FOUNDATION, Seoul (KR)

(72) Inventors: Jonghyun Chae, Daejeon (KR); Jong-Chan Lee, Seoul (KR); Yeonju Lee, Daejeon (KR); Daeil Kim, Daejeon (KR); Lucia Kim, Daejeon (KR); Jehoon Lee, Daejeon (KR); Na Kyung Kim, Seoul (KR); Daun Jeong, Seoul (KR)

(73) Assignees: LG ENERGY SOLUTION, LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 584 days.

(21) Appl. No.: 16/643,367

(22) PCT Filed: Jul. 12, 2018

(86) PCT No.: PCT/KR2018/007895
§ 371 (c)(1),
(2) Date: Feb. 28, 2020

(87) PCT Pub. No.: WO2019/066219
PCT Pub. Date: Apr. 4, 2019

(65) Prior Publication Data
US 2020/0350586 A1 Nov. 5, 2020

(30) Foreign Application Priority Data
Sep. 28, 2017 (KR) .................. 10-2017-0126604

(51) Int. Cl.
H01M 4/60 (2006.01)
H01M 4/02 (2006.01)
(Continued)

(52) U.S. Cl.
CPC .......... H01M 4/608 (2013.01); H01M 10/04 (2013.01); H01M 10/0525 (2013.01);
(Continued)

(58) Field of Classification Search
CPC ............ H01M 4/608; H01M 10/0565; H01M 10/0567; H01M 10/0569; H01M 50/409;
(Continued)

(56) References Cited

U.S. PATENT DOCUMENTS 9,379,368 B2 * 6/2016 Roumi ................ H01M 4/5825
2003/0088032 A1 5/2003 Luebben et al.
(Continued)

FOREIGN PATENT DOCUMENTS

CN 102723491 A 10/2012
CN 103753926 A 4/2014
(Continued)

OTHER PUBLICATIONS

Abbas et al., "Bifunctional separator as a polysulfide mediator for highly stable Li—S batteries", J. Mater. Chem. A, 2016, 4, 9661 (Year: 2016).*
(Continued)

*Primary Examiner* — Ula C Ruddock
*Assistant Examiner* — Anna Korovina
(74) *Attorney, Agent, or Firm* — Birch, Stewart, Kolasch & Birch, LLP

(57) ABSTRACT

A polymer material for a lithium secondary battery having ionic conductivity and electronic conductivity at the same time, and a method for preparing the same. The polymer material includes a polythiophene-based polymer and a
(Continued)

conductive polymer, and the polymer material may be formed by forming a polythiophene-based polymer, forming a conductive polymer, and heat-treating the polythiophene-based polymer and the conductive polymer.

5 Claims, 3 Drawing Sheets

(51) Int. Cl.
  *H01M 10/04* (2006.01)
  *H01M 10/0525* (2010.01)
  *H01M 10/0565* (2010.01)
  *H01M 50/414* (2021.01)

(52) U.S. Cl.
  CPC ..... *H01M 10/0565* (2013.01); *H01M 50/414* (2021.01); *H01M 2004/028* (2013.01); *H01M 2300/0065* (2013.01)

(58) Field of Classification Search
  CPC ........ H01M 6/18; H01M 6/181; H01B 1/127; Y02E 60/10; H01G 11/56; H01G 8/025; C08G 61/126; C08G 2261/3223
  See application file for complete search history.

(56) References Cited

U.S. PATENT DOCUMENTS

| | | | |
|---|---|---|---|
| 2009/0176160 A1* | 7/2009 | Newman | H01M 50/426 |
| | | | 429/248 |
| 2012/0175564 A1 | 7/2012 | Jin et al. | |
| 2014/0183407 A1 | 7/2014 | Lee et al. | |
| 2014/0315081 A1 | 10/2014 | Zhang et al. | |
| 2015/0303477 A1 | 10/2015 | Lovenich et al. | |
| 2015/0364766 A1 | 12/2015 | Lee et al. | |
| 2018/0019471 A1* | 1/2018 | Wu | H01M 4/38 |

FOREIGN PATENT DOCUMENTS

| | | | |
|---|---|---|---|
| CN | 104956523 A | | 9/2015 |
| CN | 106803574 A | | 6/2017 |
| JP | 4-287074 A | | 9/1992 |
| JP | 2004079437 A | * | 3/2004 |
| JP | 2004-185865 A | | 7/2004 |
| JP | 2004185865 | * | 7/2004 |
| JP | 2016-504434 A | | 2/2016 |
| KR | 10-2002-0083117 A | | 11/2002 |
| KR | 10-0666133 B1 | | 1/2007 |
| KR | 10-2012-0080935 A | | 7/2012 |
| KR | 10-2013-0110590 A | | 10/2013 |
| KR | 101455943 | * | 11/2014 |
| KR | 10-2016-0100133 A | | 8/2016 |
| KR | 10-1743909 B1 | | 6/2017 |
| KR | 10-2017-0085195 A | | 7/2017 |
| KR | 10-1748684 B1 | | 7/2017 |
| KR | 10-2017-0090098 A | | 8/2017 |
| KR | 20170090098 | * | 8/2018 |

OTHER PUBLICATIONS

Shin et al., KR-101455943 Machine Translation (Year: 2014).*
Awano et al., JP-2004079437 Machine Translation (Year: 2004).*
Akbulut et al., "Polythiophene-g-poly(ethylene glycol) with Lateral Amino Groups as a Novel Matrix for Biosensor Construction", ACS Appl. Mater. Interfaces 2015, vol. 7, ppl 20612-20622.
Cintora-Juarez et al., "Judicious design of lithium iron phosphate electrodes using poly(3,4-ethylenedioxythiophene) for high performance batteries", J. Mater. Chem. A, 2015, vol. 3, pp. 14254-14262.
International Search Report (PCT/ISA/210) issued in PCT/KR2018/007895, mailed on Oct. 15, 2018.
Javier et al., "Simultaneous Electronic and Ionic Conduction in a Block Copolymer: Application in Lithium Battery Electrodes", Angew. Chem. Int. Ed. 2011, vol. 50, pp. 9848-9851.
Wu et al., "Discharge Characteristics of Lithium Battery Electrodes with a Semiconducting Polymer Studied by Continuum Modeling and Experiment", Journal of The Electrochemical Society, 2014, vol. 161, No. 12, pp. A1836-A1843.
Extended European Search Report for European Application No. 18861536.3, dated Oct. 14, 2020.

* cited by examiner

[Figure 1]
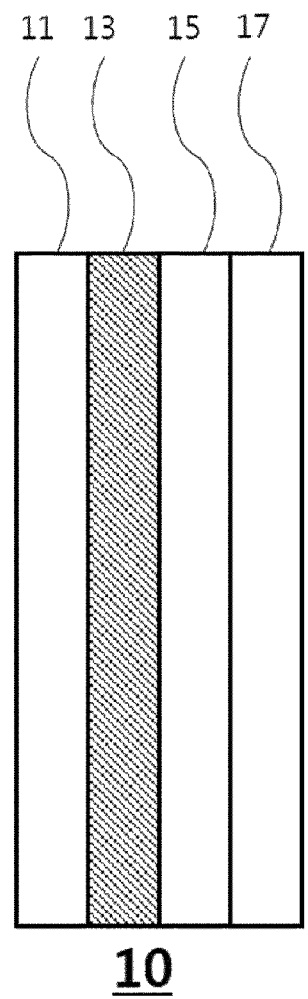

[Figure 2]
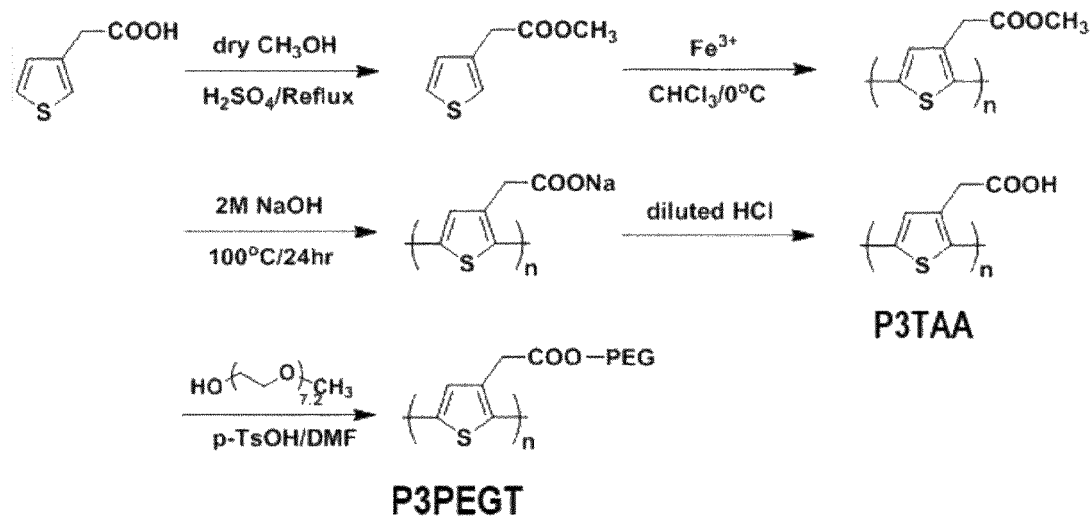
[Figure 3]
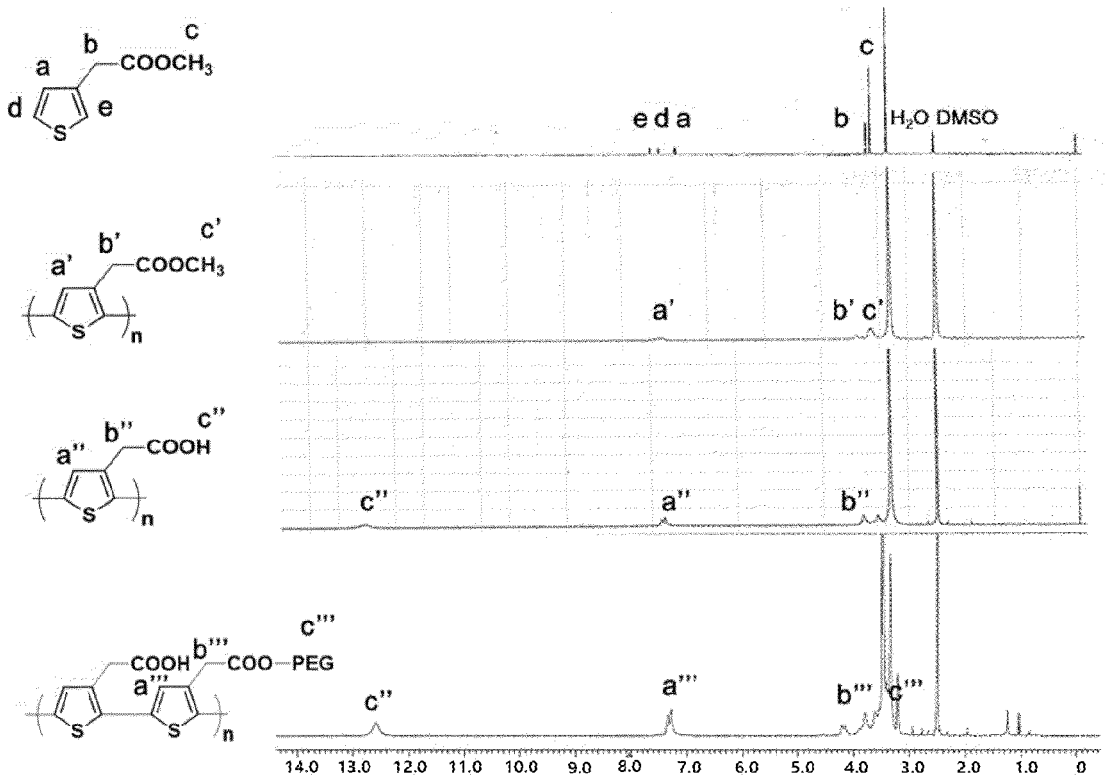

[Figure 4]
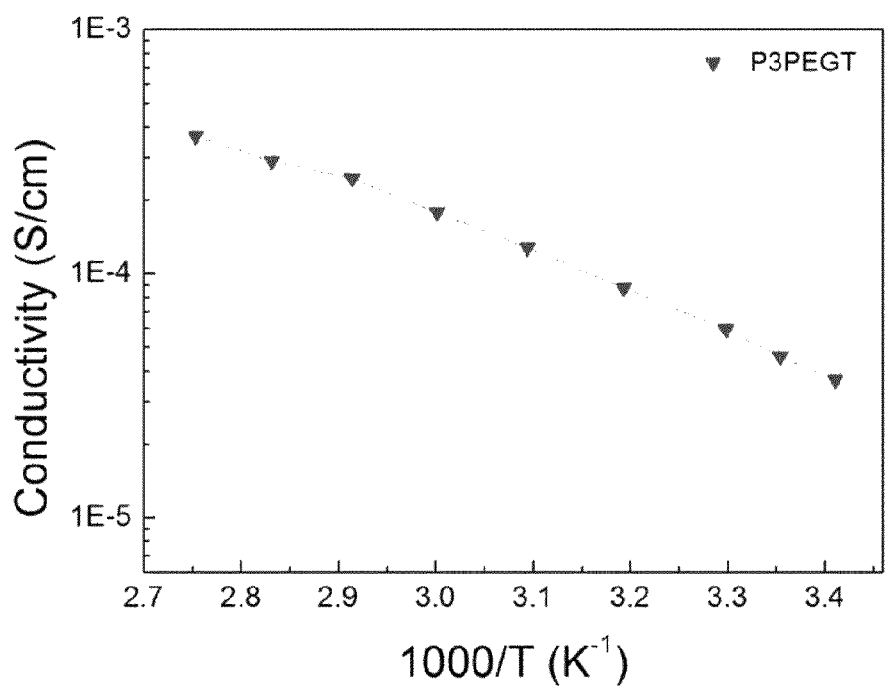

LITHIUM SECONDARY BATTERY POLYMER MATERIAL AND MANUFACTURING METHOD THEREFOR

TECHNICAL FIELD

This application claims the benefit of priority based on Korean Patent Application No. 10-2017-0126604, filed on Sep. 28, 2017, the entire contents of which are incorporated herein by reference.

The present invention relates to a polymer material for a lithium secondary battery and a method of preparing the same.

BACKGROUND ART

Lithium secondary batteries are used in a variety of industries ranging from small electronic devices such as smart phones, notebooks and tablet PCs, to automotive batteries. They are being developed in a technical direction of miniaturization, weight reduction, high performance, and high capacity.

The lithium secondary battery includes a negative electrode, a positive electrode, and an electrolyte. The negative electrode active material of the lithium secondary battery may be lithium, carbon and the like, the positive electrode active material may be a transition metal oxide, a metal chalcogen compound, a conductive polymer and the like, and the electrolyte can be a liquid electrolyte, a solid electrolyte, a polymer electrolyte and the like.

The lithium secondary battery, which is currently commercialized, uses a liquid electrolyte in which a lithium salt is dissolved in an organic carbonate-based solvent. However, since it has safety problems such as leakage, volatilization and explosion due to external stimulus or temperature rise. Therefore, it is necessary to study the solid polymer electrolyte to solve these problems.

Ultimately, it is ideal to implement an all solid-state battery system based on such solid polymer electrolyte, and for this purpose, it is urgent to develop the solid polymer electrolyte having high ionic conductivity ($>10^{-4}$ S/cm, 25° C.). Since the 1970s, although studies on poly (ethylene oxide) (PEO) known as lithium ionic conductive polymers, its derivatives and complexes have been actively conducted to construct a library, it is still difficult to implement an all solid-state battery system due to the problems of low ionic conductivity and high interface resistance. In order to solve these problems, if an ionic and electronic conductive polymer material has been developed and thus such a material has been made to function as a solid electrolyte, an electrode binder, and a conductive material, it is expected that it is possible to manufacture the battery by a method of not only reducing the interfacial resistance but also excluding the conductive carbon which is the conductive material of the existing commercialization system.

PRIOR ART DOCUMENTS

Patent Documents (Patent Document 1) Korean Patent Publication No. 10-1743909 (May 31, 2017), "Photovoltaic efficiency and mechanical stability improved conducting polymer for all-polymer solar cells"

(Patent Document 2) Korean Patent Publication No. 10-1748684 (Jun. 13, 2017), "All-polymer solar cells using active layer consisted of polymers"

Non-Patent Documents (Non-Patent Document 1) Anna E. Javier, Shrayesh N. Patel, Daniel T. Hallinan Jr., Venkat Srinivasan, and Nitash P. Balsara, "Simultaneous Electronic and Ionic Conduction in a Block Copolymer: Application in Lithium Battery Electrodes" *Angew Chem Int Ed Engl.* 2011 Oct. 10; 50(42): 9848-51.

DISCLOSURE

Technical Problem

Therefore, in order to solve the problems of leakage and explosion due to the electrolytes used in the conventional lithium secondary batteries and the problems of low ionic conductivity of existing solid electrolytes, the present invention employed a polymer material for lithium secondary batteries having improved ionic conductivity and electronic conductivity, which can be applied especially to all solid-state batteries, especially in lithium secondary batteries, and as a result, the present invention has been accomplished by confirming that the above problems can be solved and thus the performance of the lithium secondary battery can be improved.

Accordingly, it is an object of the present invention to provide a polymer material for a lithium secondary battery, which comprises a polymer blend of polythiophene-based polymers and conductive polymers which can solve the problems caused by the low ionic conductivity of conventional solid electrolytes.

In addition, it is another object of the present invention to provide a lithium secondary battery including the polymer material.

In addition, it is still another object of the present invention to provide a method of preparing the polymer material.

Technical Solution

The present invention provides a polymer material for a lithium secondary battery comprising a polythiophene-based polymer represented by Formula 1 below and a conductive polymer.

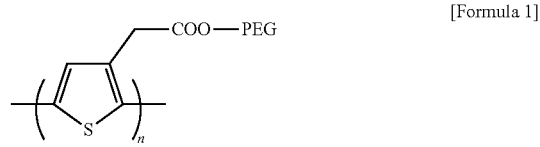

[Formula 1]

wherein n is 70 to 280, PEG is polyethylene glycol, and when the number of ethylene oxide units of PEG is m, m is 4 to 15.

At this time, the conductive polymer is characterized by comprising poly-(3,4-ethylenedioxythiophene):poly (styrenesulfonate) (PEDOT:PSS).

In addition, the present invention provides a method for preparing a polymer material for a lithium secondary battery, which comprises forming a polythiophene-based polymer represented by Formula 1; forming a conductive polymer; and heat treating the polythiophene-based polymer and the conductive polymer.

The present invention also provides the polythiophene-based polymer represented by the above Formula 1.

Advantageous Effects

According to embodiments of the present invention, the polymer material for the lithium secondary battery has excellent ionic conductivity and electronic conductivity and can effectively improve the performance of the battery by effectively reducing the interfacial resistance between the electrode and the electrolyte of the lithium secondary battery. Since the polymer material for the lithium secondary battery can be made in the form of a film and can function as an electrolyte, a binder, and a conductive material in an all-solid-state battery system, the polymer material can be expected to reduce the weight of the lithium secondary battery and simplify the manufacturing process.

DESCRIPTION OF DRAWINGS

FIG. 1 is a sectional view showing the lithium secondary battery according to the present invention.

FIG. 2 shows a method for preparing poly(3-polyethylene glycol thiophene), which is a polythiophene-based polymer according to the present invention.

FIG. 3 is a $^1$H-NMR spectrum of poly(3-polyethylene glycol thiophene) according to the present invention.

FIG. 4 shows the total conductivity depending on the temperature of poly(3-polyethylene glycol thiophene) according to the present invention.

BEST MODE

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is only for the purpose of describing particular embodiments and is not intended to be limiting of the invention. The singular forms "a," "an," and "the" include plural referents unless the context clearly dictates otherwise. In the present invention, it should be understood that terms such as "comprise" or "have" designate the presence of stated features, figures, steps, operations, components, parts or combinations thereof, but does not preclude the presence or addition of one or more other features, figures, steps, operations, components, parts or combinations thereof.

Polymer Material for Lithium Secondary Battery

The polymer material for the lithium secondary battery according to the present invention may comprise a polythiophene-based polymer represented by the following Formula 1 and a conductive polymer.

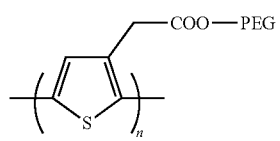

[Formula 1]

wherein n is 70 to 280, PEG is polyethylene glycol, and when the number of ethylene oxide units of PEG is m, m is 4 to 15, preferably 6 to 12.

The polymer represented by Formula 1 is poly(3-polyethylene glycol thiophene) (hereinafter, referred to as P3PEGT), and has a structure comprising polythiophene main chain and polyethylene glycol side chain. The polymer exhibits an ion conductivity of $10^{-5}$ S/cm, but the electronic conductivity is about $10^{-7}$ S/cm, so it exhibits low electronic conductivity that is not sufficient for use in lithium secondary batteries.

Accordingly, the present invention provides a polymer material for a lithium secondary battery including a blend-type polymer formed by blending the above polymer with a conductive polymer to improve electronic conductivity.

The conductive polymer may include poly-(3,4-ethylenedioxythiophene):poly (styrenesulfonate) (PEDOT:PSS). The electronic conductivity can be improved to a level of $10^{-2}$ S/cm by blending the conductive polymer with P3PEGT. Therefore, the polymer material for the lithium secondary battery according to the present invention can simultaneously solve the problems of the low ionic conductivity and the low electronic conductivity of existing solid electrolytes.

According to an embodiment of the present invention, the polythiophene-based polymer and the conductive polymer may be contained in a weight ratio of 95:5 to 80:20.

If the range of the polythiophene-based polymer is less than the above range, the basic effect according to the present invention cannot be exhibited. If the polythiophene-based polymer exceeds the above range, the electronic conductivity may be lowered. Therefore, the range of polythiophene-based polymer is appropriately adjusted within the above range.

The polymer material for the lithium secondary battery comprising the blend-type polymer according to an embodiment of the present invention may have an ionic conductivity of $10^{-6}$ to $10^{-4}$ S/cm and may have an electronic conductivity of $10^{-8}$ to $10^{-2}$ S/cm.

Prior art in the adjacent field discloses a copolymer comprising a polythiophene-based polymer represented by the following Reaction Scheme 1.

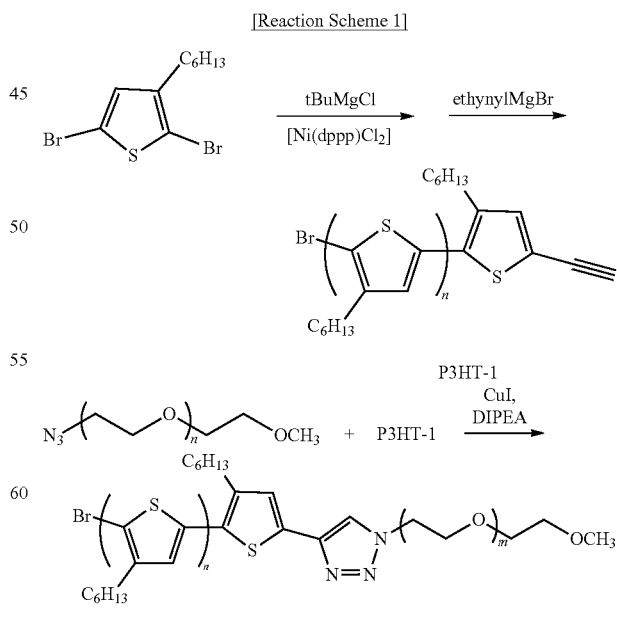

[Reaction Scheme 1]

The poly-3-hexylthiophene-polyethylene oxide block copolymer (P3HT-PEO), which is a copolymer disclosed in Scheme 1, has an ionic conductivity of about $1.1 \times 10^{-4}$ S/cm and an electronic conductivity of about $6.7 \times 10^{-6}$ S/cm at 90° C., and thus there is still a problem that the ionic conductivity and electronic conductivity are not sufficiently high.

In order to overcome the disadvantages of the prior art, the present invention can improve the electronic conductivity to $10^{-2}$ S/cm at the same time while having the ionic conductivity of $10^{-5}$ S/cm or more at room temperature by providing the polymer material comprising the polythiophene-based polymer blended with the conductive polymer.

One embodiment of the present invention may be a positive electrode for a lithium secondary battery including the polymer material for the lithium secondary battery.

Also, one embodiment of the present invention may be a lithium secondary battery including the positive electrode.

The polymer material for the lithium secondary battery may further comprise a lithium salt. The lithium salt is used to increase the lithium ionic conductivity. The lithium salt is not particularly limited in the present invention and can be used as long as it is a lithium salt known in the art of lithium secondary battery.

For example, the lithium salt may include at least one lithium salt selected from the group consisting of LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, LiTFSI, $Li(FSO_2)_2N$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, $LiOH \cdot H_2O$, $LiB(C_2O_4)_2$, lithium chloroborane, lithium lower aliphatic carboxylate, lithium tetraphenyl borate, lithium imide and a combination thereof.

The lithium salt is preferably contained in an amount of 60 parts by weight or less, preferably 5 to 50 parts by weight, based on 100 parts by weight of the blend-type polymer contained in the polymer material. If the content of the lithium salt is less than the above range, it is not easy to secure lithium ionic conductivity. On the contrary, when the content exceeds the above range, it is not economical because there is no large increase in effect. Therefore, the content is appropriately selected within the above range.

The lithium secondary battery proposed in the present invention may preferably be an all-solid-state battery.

FIG. 1 is a sectional view showing the lithium secondary battery 10 according to the present invention. Referring to FIG. 1, the lithium secondary battery 10 may include a positive electrode 11, a negative electrode 17, a layer 13 containing the polymer material for the lithium secondary battery according to the present invention, and a separator 15 interposed therebetween. The layer 13 containing the polymer material for the lithium secondary battery exhibits high ionic and electronic conductivity and is preferably used as an electrolyte, a binder and a conductive material of the battery to improve the performance of the battery. A specific method of applying the layer 13 containing the polymer material for the lithium secondary battery is not particularly limited in the present invention and any method known to those skilled in the art can be selected and applied.

The positive electrode 11 of the lithium secondary battery 10 may include, but is not limited to, a layered compound such as lithium cobalt oxide ($LiCoO_2$) or lithium nickel oxide ($LiNiO_2$), or a compound substituted with one or more transition metals; lithium manganese oxides represented by formula $Li_{1+x}Mn_{2-x}O_4$ ($0 \leq x \leq 0.33$) such as $LiMnO_3$, $LiMn_2O_3$, $LiMnO_2$; a lithium copper oxide ($Li_2CuO_2$); $LiFe_3O_4$; vanadium oxides such as $LiV_3O_8$, $V_2O_5$, $Cu_2V_2O_7$; Ni site-type lithium nickel oxides represented by formula $LiNi_{1-x}M_xO_2$ (M=Co, Mn, Al, Cu, Fe, Mg, B or Ga, and $0.01 \leq x \leq 0.3$); lithium manganese composite oxides represented by formula $LiMn_{2-x}M_xO_2$ (M=Co, Ni, Fe, Cr, Zn or Ta, and $0.01 \leq x \leq 0.1$) or $Li_2Mn_3MO_8$ (M=Fe, Co, Ni, Cu or Zn); lithium manganese composite oxides having a spinel structure represented by $LiNi_xMn_{2-x}O_4$; $LiMn_2O_4$ in which a part of Li in the formula is substituted with an alkaline earth metal ion; disulfide compounds; chalcogenides such as $Fe_2(MoO_4)_3$, $Cu_2Mo_6S_8$, FeS, CoS and MiS; and oxides, sulfides or halogenides of scandium, ruthenium, titanium, vanadium, molybdenum, chromium, manganese, iron, cobalt, nickel, copper, zinc or the like as a positive electrode active material, and more preferably, may comprise $TiS_2$, $ZrS_2$, $RuO_2$, $Co_3O_4$, $Mo_6S_8$, $V_2O_5$ or the like as a positive electrode active material.

This positive electrode active material may be formed on the positive electrode current collector or may be in the form of being dispersed on the layer containing the polymer material according to the present invention along with a lithium salt or the like. The positive electrode current collector is not particularly limited as long as it has high conductivity without causing chemical change in the battery, the examples thereof may be stainless steel, aluminum, nickel, titanium, sintered carbon, or aluminum or stainless steel surface-treated with carbon, nickel, titanium or silver. At this time, the positive electrode current collector may be used in various forms such as film, sheet, foil, net, porous substance, foam or nonwoven fabric having fine irregularities formed on its surface so as to increase the adhesive force with the positive electrode active material.

In addition, the negative electrode 17 is formed by forming a negative electrode mixture layer having a negative electrode active material on the negative electrode current collector or uses a negative electrode mixture layer (for example, lithium foil) alone.

At this time, the kinds of the negative electrode current collector and the negative electrode mixture layer are not particularly limited in the present invention, and known materials can be used.

In addition, the negative electrode current collector is not particularly limited as long as it has electrical conductivity without causing chemical changes in the battery. For example, copper, stainless steel, aluminum, nickel, titanium, sintered carbon; copper or stainless steel surface-treated with carbon, nickel, titanium, silver or the like; aluminum-cadmium alloy or the like may be used as the negative electrode current collector. In addition, the negative electrode current collector may be used in various forms such as film, sheet, foil, net, porous substance, foam or nonwoven fabric having fine irregularities formed on its surface, in common with the positive electrode current collector In addition, the negative electrode active material may include, but is not limited to, at least one carbon-based material selected from the group consisting of crystalline artificial graphite, crystalline natural graphite, amorphous hard carbon, low crystalline soft carbon, carbon black, acetylene black, Ketjen black, Super-P, graphene, and fibrous carbon; Si-based material; metal composite oxides such as $Li_xFe_2O_3$ ($0<x\leq1$), $Li_xWO_2$ ($0<x\leq1$), $Sn_xMe_{1-x}Me'_yO_z$ (Me: Mn, Fe, Pb, Ge; Me': Al, B, P, Si, group 1, group 2 or group 3 elements of the element periodic table, halogen; $0<x\leq1$; $1\leq y \leq 3$; $1\leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; conductive polymers such as polyacetylene; Li—Co—Ni-based material; titanium oxide; lithium titanium oxide; or the like.

Additionally, as the negative electrode active material, metal composite oxides such as $Sn_xMe_{1-x}Me'_yO_z$ (Me: Mn, Fe, Pb, Ge; Me': Al, B, P, Si, group 1, group 2 or group 3 elements of the element periodic table, halogen; $0<x\leq1$; $1\leq y\leq3$; $1\leq z\leq8$); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$ may be used, and carbon-based negative electrode active materials such as crystalline carbon, amorphous carbon or carbon composite may be used alone or in combination of two or more.

The separator according to the present invention is for physically separating both electrodes in the lithium secondary battery of the present invention, and can be used without limitation as long as it is conventionally used as a separator in a lithium secondary battery.

The separator may be formed of a porous substrate. The porous substrate may be any porous substrate commonly used in an electrochemical device. For example, a polyolefin-based porous film or a nonwoven fabric may be used, but it is not particularly limited thereto.

Examples of the polyolefin-based porous membrane may include a membrane formed by each of polyethylenes such as high density polyethylene, linear low density polyethylene, low density polyethylene, and ultrahigh molecular weight polyethylene, and polyolefin-based polymer such as polypropylene, polybutylene and polypentene, etc. or a mixture of these polymers.

The nonwoven fabric may be a nonwoven fabric formed by each of, for example, polyethylene terephthalate, polybutylene terephthalate, polyester, polyacetal, polyamide, polycarbonate, polyimide, polyetheretherketone, polyethersulfone, polyphenyleneoxide, polyphenylenesulfide and polyethylene naphthalate, or a mixture of these polymers, in addition to the polyolefin-based nonwoven fabric. The structure of these nonwoven fabrics may be spun-bond or melt-blown nonwoven fabric consisting of long fibers.

The thickness of the porous substrate is not particularly limited, but is preferably in the range of 1 to 100 μm, more preferably in the range of 5 to 50 μm.

The pore size and porosity present in the porous substrate are not particularly limited, but may be 0.001 to 50 μm and 10 to 95% respectively.

The layer 13 including the polymer material for the lithium secondary battery according to the present invention simultaneously exhibits good ionic conductivity and electronic conductivity and thus has advantages of being able to replace the liquid electrolyte or the binder such as PVDF used in a conventional lithium ion battery and reducing the weight of carbon, a conductive material or even eliminating it. That is, the layer 13 including the polymer material for the lithium secondary battery functions as an electrolyte, a binder, and a conductive material at the same time, and thus can effectively reduce the interfacial resistance between the electrode and the electrolyte in the all solid-state battery system, a type of lithium secondary battery.

The type of lithium secondary battery 10 as described above is not particularly limited, and may be, for example, a jelly-roll type, a stack type, a stack-folding type (including a stack-Z-folding type), or a lamination-stack type, preferably a stack-folding type.

The electrode assembly in which the positive electrode 11, the layer 13 including the polymer material for the lithium secondary battery, and the negative electrode 17 are sequentially stacked is prepared, and thereafter the electrode assembly is inserted into the battery case, and then sealed with cap plate and gasket to assemble the lithium secondary battery.

In this case, the lithium secondary battery 10 can be classified into cylindrical, rectangular, coin-shaped, pouch type depending on the type, and can be divided into bulk type and thin film type depending on the size. The structure and preparation method of these batteries are well known in the art, and thus detailed description thereof is omitted.

The lithium secondary battery 10 according to the present invention can be used as a power source for devices requiring high capacity and high rate characteristics, etc. Specific examples of the device may include, but are not limited to, a power tool that is powered by a battery powered motor; electric cars including an electric vehicle (EV), a hybrid electric vehicle (HEV), a plug-in hybrid electric vehicle (PHEV), and the like; an electric motorcycle including an electric bike (E-bike) and an electric scooter (Escooter); an electric golf cart; and a power storage system, Preparation Method of Polymer Material for Lithium Secondary Battery A method of preparing a polymer material for a lithium secondary battery including a blend-type polymer according to an embodiment of the present invention comprises (a) forming a polythiophene-based polymer represented by the following Formula 1;

(b) forming a conductive polymer; and (c) heat treating the polythiophene-based polymer and the conductive polymer:

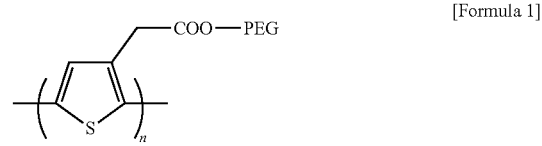
[Formula 1]

wherein n is 70 to 280, PEG is polyethylene glycol, and when the number of ethylene oxide units of PEG is m, m is 4 to 15.

At this time, the step (a) may comprise, (a1) adding methanol and sulfuric acid to thiophene acetic acid to form thiophene methyl acetate;

(a2) adding iron chloride to thiophene methyl acetate to form polythiophene methyl acetate;

(a3) adding sodium hydroxide to the polythiophene methyl acetate to form polythiophene sodium acetate;

(a4) adding hydrogen chloride to the polythiophene sodium acetate to form polythiophene acetic acid; and (a5) adding polyethylene glycol to the polythiophene acetic acid to form poly(3-polyethylene glycol thiophene).

FIG. 2 shows a method for preparing poly(3-polyethylene glycol thiophene) (P3PEGT), which is a polythiophene-based polymer according to the present invention.

Between the step (b) and the step (c), a step of mixing the polythiophene-based polymer and the conductive polymer, coating them on a separate substrate, and separating them may be further included.

At this time, the substrate may be a glass substrate or a plastic substrate. The plastic substrate may be a film of various plastics selected from polyethylene terephthalate, polyethylene naphthalate, polypropylene, polyethylene, cellulose triacetate, cellulose diacetate, poly(meth)acrylic acid alkyl ester, poly(meth)acrylic acid ester copolymer, polyvinyl chloride, polyvinyl alcohol, polycarbonate, polystyrene, cellophane, polyvinylidene chloride copolymer, polyamide, polyimide, vinyl chloride-vinyl acetate copolymer, polytetrafluoroethylene, polytrifluoroethylene and the like. Composite materials composed of two or more of these materials may also be used.

Non-limiting examples of such coatings may include, but are not limited to, methods such as spin coating, doctor blade coating, dip coating, solvent casting, slot die coating, spray coating, roll coating, extrusion coating, curtain coating, die coating, wire bar coating or knife coating.

At this time, in order to produce a uniform polymer material, it is necessary to adjust the parameters in each process.

For example, the spin coating is performed at 500 to 4000 rpm. In the case of the doctor blade coating, an apparatus having a gap of 10 to 200 μm in thickness may be used. In addition, when the spray coating is carried out, it can be carried out by spraying with an injection frequency between 5 and 100 times through an injection pressure of 0.5 to 20 MPa. The design of such a process and the selection of parameters can be controlled by a person skilled in the art.

After coating, the solution is dried to form the polymer material for the lithium secondary battery.

Drying is preferably carried out at 60 to 150° C. for 30 seconds to 15 minutes although it depends on each constituent or content ratio.

At this time, the drying may be performed by any one of hot air drying, electromagnetic wave drying, vacuum drying, spray drying, drum drying and freeze drying, preferably by hot air drying.

The thickness of the polymer material formed after coating and drying is formed to be the thickness of the polymer material to be finally formed, and if necessary, the coating-drying or coating step is performed at least once.

In one embodiment of the present invention, the heat treatment in step (c) may be performed at 120 to 250° C., preferably at 180 to 220° C. If the heat treatment is performed at a temperature lower than the above temperature range, the polythiophene-based polymer and the conductive polymer cannot be blended smoothly and thus cannot exhibit desired electronic conductivity. If the heat treatment is performed at a temperature higher than the above temperature range, there is a problem that pyrolysis of the polymer itself in the polymer material may occur. Therefore, the temperature of the heat treatment is appropriately adjusted within the above range.

This heat treatment step may be carried out in the atmosphere or an inert gas atmosphere. In one embodiment of the present invention, the inert gas may be one selected from the group consisting of nitrogen, argon, helium, neon, krypton, and xenon, or a combination of two or more.

One embodiment of the present invention may be the polymer material for the lithium secondary battery prepared by the preparation method and the lithium secondary battery including the same Hereinafter, Examples, Comparative Examples and Experimental Examples will be described below to help understand the effects of the present invention. It should be noted, however, that the following description is only an example of the contents and effects of the present invention, and the scope and effect of the present invention are not limited thereto.

EXAMPLES

Preparation Example

Preparation of poly(3-polyethylene glycol thiophene) (P3PEGT)

FIG. 2 shows a method for preparing P3PEGT, which is a polymer according to one embodiment of the present invention.

Referring to FIG. 2, P3PEGT, a polymer, can be synthesized by the following procedure.

To a 100 mL two-neck round bottom flask, 10 g of thiophene acetic acid (3-thiophene acetic acid), 50 ml of distilled methanol, and 1 drop of sulfuric acid were added and stirred at 100° C. for 24 hours, and then, removed the methanol through reduced pressure by vacuum, dissolved in diethyl ether and extracted three times with distilled water. To the diethyl ether layer, magnesium sulfate was added to remove moisture, followed by filtration to obtain thiophene methyl acetate (3-thiophene methyl acetate).

To 2 g of thiophene methyl acetate, 8.0 g of iron chloride was added and dissolved in 30 mL of chloroform. Thereafter, the mixture was stirred at 0° C. under nitrogen atmosphere for 24 hours to obtain polythiophene methyl acetate (poly(3-thiophene methyl acetate)).

To the polythiophene methyl acetate obtained above, a 6M aqueous solution of sodium hydroxide was added and stirred at 100° C. for 24 hours to obtain polythiophene sodium acetate (poly(3-thiophene sodium acetate)). To the polythiophene sodium acetate, 1 M hydrogen chloride was added and stirred for 24 hours to obtain polythiophene acetic acid. After the polythiophene acetic acid was dried in a vacuum, 1 g of polythiophene acetic acid and p-toluenesulfonic acid (pTsOH) as a catalyst were dissolved in 50 ml of dimethylacetamide (DMAC) as a solvent at a molar ratio of 10:1. As much water as possible was removed using Dean-Stark distillation, and polyethylene glycol (Mn=400) was added little by little. The reaction product was precipitated in water to give pure P3PEGT. The n value was 110 to 130 based on the Formula 1 of the present invention.

Example 1

A polymer material solution was prepared by dissolving P3PEGT prepared in the above Preparation Example and PEDOT:PSS (3 wt. % in $H_2O$, 200 S/cm, Sigma-Aldrich) as a conductive polymer at a weight ratio of 80:20 in dimethylsulfoxide (DMSO), wherein sum of the P3PEGT and PEDOT:PSS was dissolved in the amount of 5 parts by weight relative to the total 100 parts by weight of the dimethylsulfoxide (DMSO).

Thereafter, the solution was spin-coated on a glass substrate at 3,000 rpm for 2 minutes and then dried at 120° C. to completely dry the solvent. After that, the substrate was heat treated at 200° C. for 20 minutes and peeled off from the glass substrate to produce a polymer material in the form of a film.

Example 2

A polymer material was prepared in the same manner as in Example 1, except for using P3PEGT alone as the polymer Comparative Example 1

A polymer material was prepared in the same manner as in Example 1, except that poly-3-hexylthiophene-polyethylene oxide block copolymer (P3HT-PEO) as a polymer was dissolved in the solvent of tetrahydrofuran (THF) to prepare a solution.

Experimental Example 1

NMR Analysis of poly(3-polyethylene glycol thiophene) (P3PEGT)

FIG. 3 is a $^1$H-NMR spectrum of the polymer including P3PEGT according to one embodiment of the present invention.

Referring to FIG. 3, it was confirmed that the peaks of d and e disappeared, and thus it can be seen that polythiophene methyl acetate (poly(3-thiophene methyl acetate)) was prepared from thiophene methyl acetate. It was confirmed that the peak of c' was observed at 12 to 13 ppm, and thus it can be seen that polythiophene acetic acid (poly(3-thiophene acetic acid)) was prepared from polythiophene methyl acetate. It was confirmed that the peak of f was generated, and thus it was confirmed that poly (3-polyethylene glycol thiophene) (P3PEGT) was prepared from the poly(3-thiophene acetic acid). In addition, the structure of the polymer can also be determined through the $^1$H-NMR spectrum of the polymer.

Particularly, in order to measure $^1$H-NMR, a solvent of chloroform-d or dimethyl sulfoxide (DMSO) may be used depending on the solubility of the sample. The structure of the polythiophene methyl acetate can be confirmed through the solvent. The polythiophene methyl acetate may have the form of a light brown powder. The structure of polythiophene acetic acid can be confirmed through the solvent. The polythiophene acetic acid may have the form of a thick brown powder. The structure of poly(3-polyethylene glycol thiophene) can be confirmed through the solvent. The poly (3-polyethylene glycol thiophene) may have the form of a red powder.

Experimental Example 2

Measurement of Electronic Conductivity of Polymer Material

The thickness of the polymer materials prepared in the above Examples and Comparative Example and the sheet resistance of the polymer materials using the 4-point probe were measured, and the electronic conductivity of the polymer materials was measured using the following equation 1. The results are shown in Table 1 below.

$$R_S t = \sigma (S \cdot cm^{-1})$$ [Equation 1]

$$\sigma = \rho^1$$

σ: Electronic conductivity
ρ: Specific resistivity
$R_s$: Sheet resistance of sample
t: Sample thickness

TABLE 1

|  | Electronic conductivity(s/cm) | Temperature for measure |
|---|---|---|
| Example 1 | $4.5 \times 10^{-2}$ | 25° C. |
| Example 2 | $8.6 \times 10^{-7}$ | 25° C. |
| Comparative Example 1 | $6.7 \times 10^{-6}$ | 90° C. |

Experimental Example 3

Measurement of Total Conductivity

A polymer material was prepared in the same manner as in the above Examples and Comparative Example by adding LiTFSI as a lithium salt to the solution of the polymer material prepared in the above Examples and Comparative Example at the ratios shown in Table 2 below.

TABLE 2

|  | LiTFSI:Ethylene oxide (mol ratio) |
|---|---|
| Example 1 | 1:0.09 |
| Example 2 | 1:0.09 |
| Comparative Example 1 | 1:0.085 |

The prepared polymer material was inserted into an electrode cell, and then the resistance was measured under conditions of 25° C., 10 mV, and $10^1$ to $10^6$ Hz through an IM-6ex resistivity meter (ZAHNER-Electric). The total conductivity was calculated by the thickness and the resistance of the film, and the ionic conductivity was determined by the following equation, and it is shown in Table 3.

Total conductivity=ionic conductivity+electronic conductivity

TABLE 3

|  | Ionic conductivity(S/cm) | Temperature for measure |
|---|---|---|
| Example 1 | $3.7 \times 10^{-5}$ | 25° C. |
|  | $3.0 \times 10^{-4}$ | 90° C. |
| Example 2 | $4.6 \times 10^{-5}$ | 25° C. |
|  | $3.7 \times 10^{-4}$ | 90° C. |
| Comparative Example 1 | $1.1 \times 10^{-4}$ | 90° C. |

As a result of the experiment, it was found that the ionic conductivity of the examples was superior to that of the comparative example 1.

The total conductivity of P3PEGT, a polythiophene-based polymer contained in the polymer material, was measured and shown in FIG. 4. Referring to FIG. 4, it was confirmed that P3PEGT according to an embodiment of the present invention show an increase in total conductivity as the temperature increases.

The invention claimed is:
1. An all-solid-state lithium secondary battery comprising an electrode assembly consisting of:
a positive electrode, a solid electrolyte, and a negative electrode, which are sequentially stacked;
wherein the solid electrolyte comprises:
a blend-type polymer formed by blending of:
(i) a polythiophene-based polymer represented by the following Formula 1:

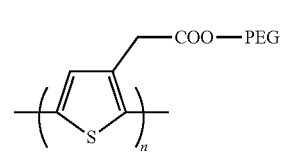

[Formula 1]

wherein n is 70 to 280, PEG is polyethylene glycol, and when a number of ethylene oxide units of PEG is m, m is 4 to 15; and (ii) a conductive polymer, wherein the conductive polymer comprises poly-(3,4-ethylenedioxythiophene): poly(styrenesulfonate)(PEDOT: PSS), wherein the polythiophene-based polymer and the conductive polymer are contained in a weight ratio of 95:5 to 80:20, wherein the blend-type polymer has an electron conductivity of $10^{-8}$ S/cm to $10^{-2}$ S/cm, and wherein the solid electrolyte is a film comprising the blend-type polymer.

2. The all-solid-state lithium secondary battery according to claim 1, wherein the blend-type polymer has an ionic conductivity of $10^{-6}$ S/cm to $10^{-4}$ S/cm.

3. A method for preparing the all-solid-state lithium secondary battery according to claim 1, comprising:

(a) forming a polythiophene-based polymer represented by the following Formula 1;

(b) forming a conductive polymer;

(c) heat treating the polythiophene-based polymer and the conductive polymer to form a blend-type polymer:

[Formula 1]

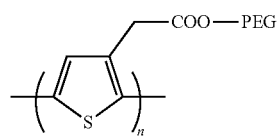

wherein n is 70 to 280, PEG is polyethylene glycol, and when a number of ethylene oxide units of PEG is m, m is 4 to 15; and (d) sequentially stacking the positive electrode, the solid electrolyte, and the negative electrode, wherein the solid electrolyte comprises the blend-type polymer.

4. The method for preparing the all-solid-state lithium secondary battery according to claim 3, wherein the step (a) comprises, (a1) adding methanol and sulfuric acid to thiophene acetic acid to form thiophene methyl acetate;

(a2) adding iron chloride to thiophene methyl acetate to form polythiophene methyl acetate;

(a3) adding sodium hydroxide to the polythiophene methyl acetate to form polythiophene sodium acetate;

(a4) adding hydrogen chloride to the polythiophene sodium acetate to form polythiophene acetic acid; and (a5) adding polyethylene glycol to the polythiophene acetic acid to form poly (3-polyethylene glycol thiophene).

5. The method for preparing the all-solid-state lithium secondary battery according to claim 3, wherein in the step (c), the heat treatment is performed at 120° C. to 250° C.

\* \* \* \* \*